United States Patent
Krause et al.

(10) Patent No.: US 6,888,091 B1
(45) Date of Patent: May 3, 2005

(54) AUTOMATIC PLASMA ARC TUBE CUTTER/WELDER

(75) Inventors: Joseph Donald Krause, Hamilton, OH (US); Jessie Morgan, Hamilton, OH (US)

(73) Assignee: Krause Morgan, Hamilton, OH (US)

(*) Notice: Subject to any disclaimer, the term of this patent is extended or adjusted under 35 U.S.C. 154(b) by 0 days.

(21) Appl. No.: 09/368,923

(22) Filed: Aug. 6, 1999

(51) Int. Cl.$^7$ .............................................. B23K 10/00
(52) U.S. Cl. ........................... 219/121.39; 219/121.45; 219/121.48; 219/121.36
(58) Field of Search ....................... 219/121.54, 121.57, 219/121.45, 121.46, 137 R, 137 PS, 121.55, 121.39

(56) References Cited

U.S. PATENT DOCUMENTS 5,266,775 A * 11/1993 Brolund et al. ........ 219/121.38
6,201,207 B1 * 3/2001 Maruyama et al. .... 219/121.39

* cited by examiner

*Primary Examiner*—Mark Paschall

(57) ABSTRACT

A device for allowing a rotating plasma arc to perform cutting or welding operations inside tubes with small inside diameters by being attached to existing plasma arc power sources where in the speed and axis of rotation of the arc are controlled by the device, and the components of the device in proximity to the plasma arc itself are protected by the ceramic composition of the device and an inert gas shield.

1 Claim, 3 Drawing Sheets

AUTOMATIC PLASMA ARC TUBE CUTTER/WELDER

BACKGROUND OF INVENTION

1. Field of the Invention

The invention relates generally to a device for cutting or welding a metal tube from the inside out using a rotating plasma arc at any prescribed depth on the tubes inside diameter.

2. Description of the Prior Art

Plasma are systems currently in use utilize an ionized gas stream for the cutting and welding of metals. Many times access to the metal is a problem for these procedures. Where metal tubes are bundled together, as they are in many heat exchanges, there is no way to cut or weld them efficiently other than by working from the inside diameter of each tube individually. This invention makes the plasma arc procedure possible on tubes with small inside diameters.

SUMMARY OF THE INVENTION

The invention relates to a device to allow a rotating plasma arc to be positioned at any depth within a metal tube for cutting or welding. It comprises a means for an attachment to existing plasma arc power sources, means for a control of the arc's speed of rotating and axis of rotation, means for a ceramic torch head with a side fired tungsten electrode to cause ionization of an inert gas stream, and an optional means for an introduction of powdered metal into the inert gas stream for welding. It is an object of the invention to provide a device which will allow the cutting and welding of those metal tubes which are more readily accessible from their inside diameters.

LIST OF REFERENCE NUMERALS

Figure 1:
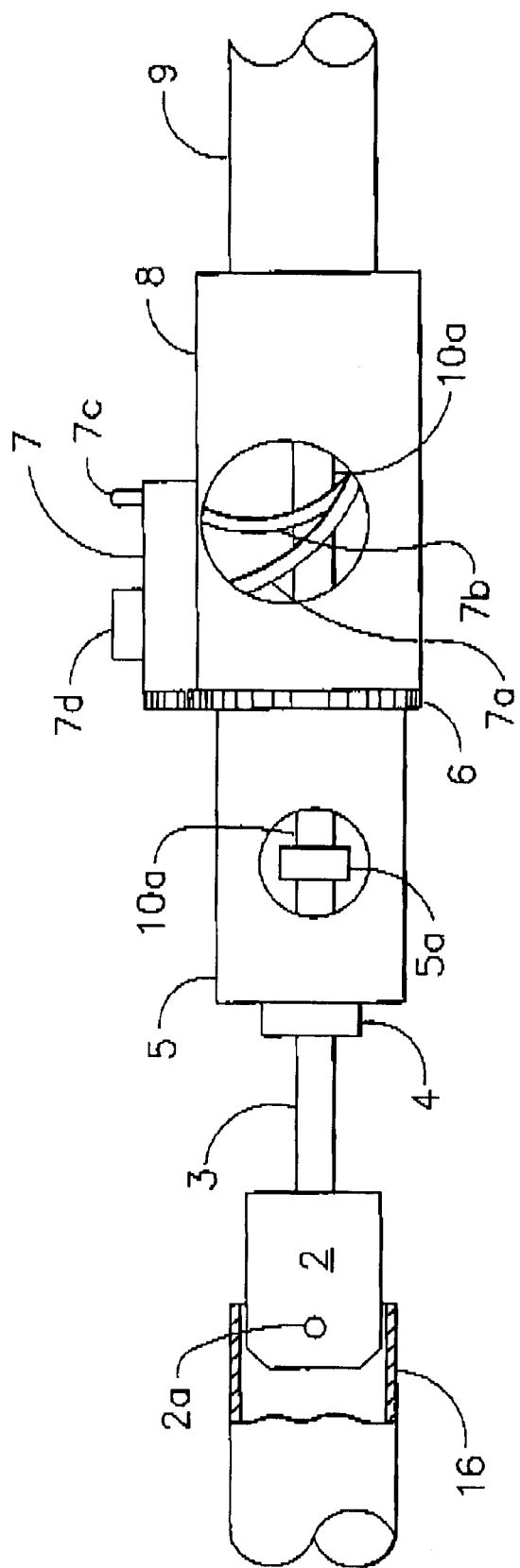
FIG. 1 is a partially cut away side view showing an embodiment of the Automatic Plasma Arc Tube Cutter/Welder.

2: boron nitride ceramic (non-conductive)
2a: orifice through which arc passes
2b: 2% thoriated tungsten electrode
2c: threaded bushing (conductive)
3: flexible metal cable with insulated outer jacket and inner gas passage (referred to as "wand" in description of operation)
4: compression fitting (non-conductive)
5: rotating housing (non-conductive)
5a: swivel connection (conductive)
6: gear set
7: junction box housing D.C. motor and controls
7a: power leads to motor
7b: control leads to switch
7c: double pole-momentary contact switch for motor and arc circuits
7d: rheostat for motor speed control
7e: transformer for motor
8: stationary housing (non-conductive)
9: sheath enclosing control leads, and power and gas lead
10: plasma arc power source
10a: power and gas lead
11: pilot arc lead
12: plasma arc ground
13: inert gas source
14: powdered metal hopper
14a: valve to let powdered metal to inert gas stream
15: D.C. motor
16: cut away section showing insertion in tube

DESCRIPTION OF THE PREFERRED EMBODIMENT

Figure 2:
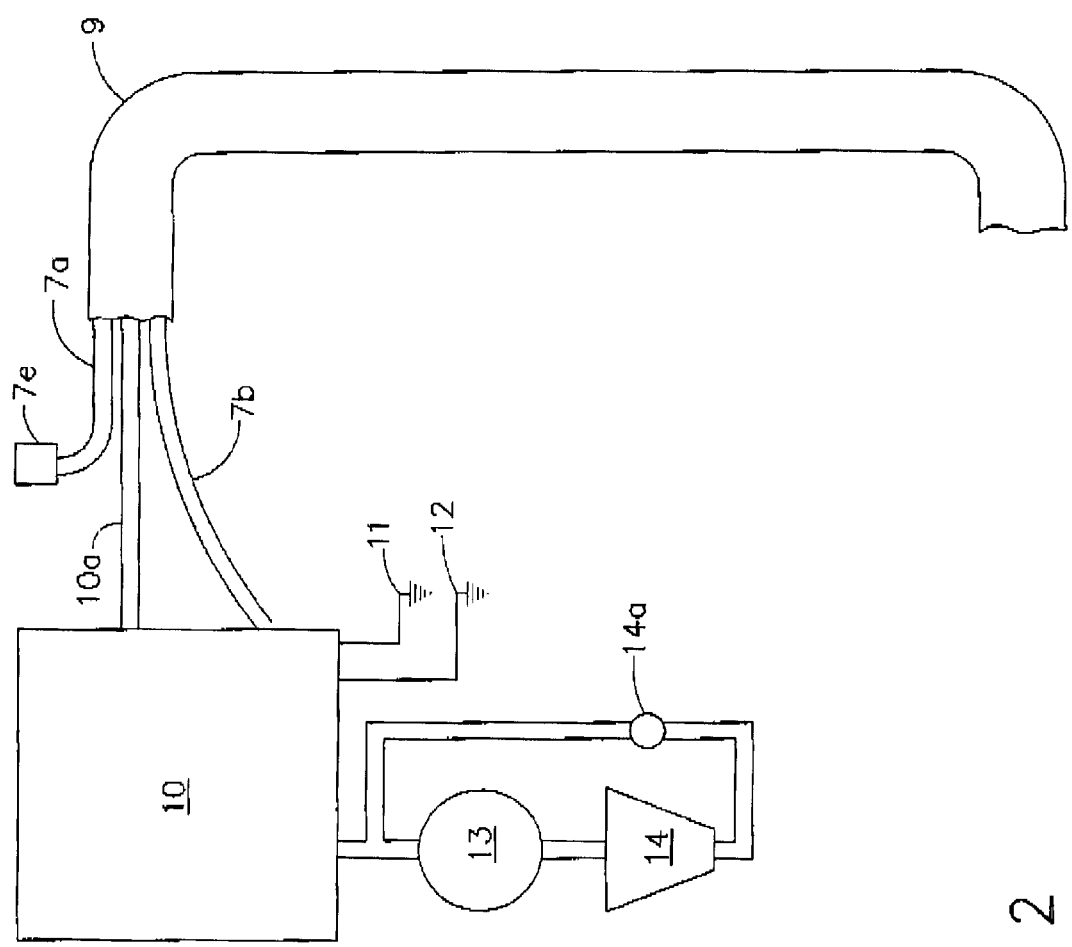
FIG. 2 is a plan view of the means of attachment to existing plasma arc power source.
Figure 4:
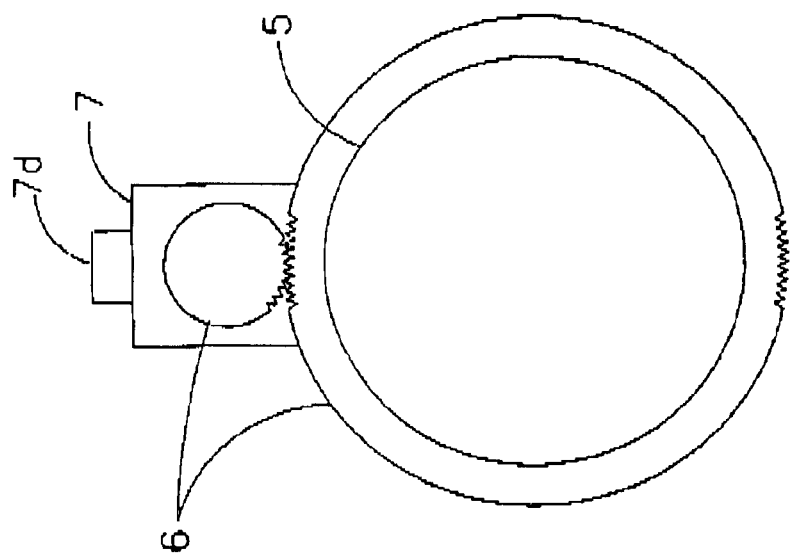
FIG. 4 is an end view showing an embodiment of the gear set joining the stationary and rotating parts of the invention.
Figure 3:
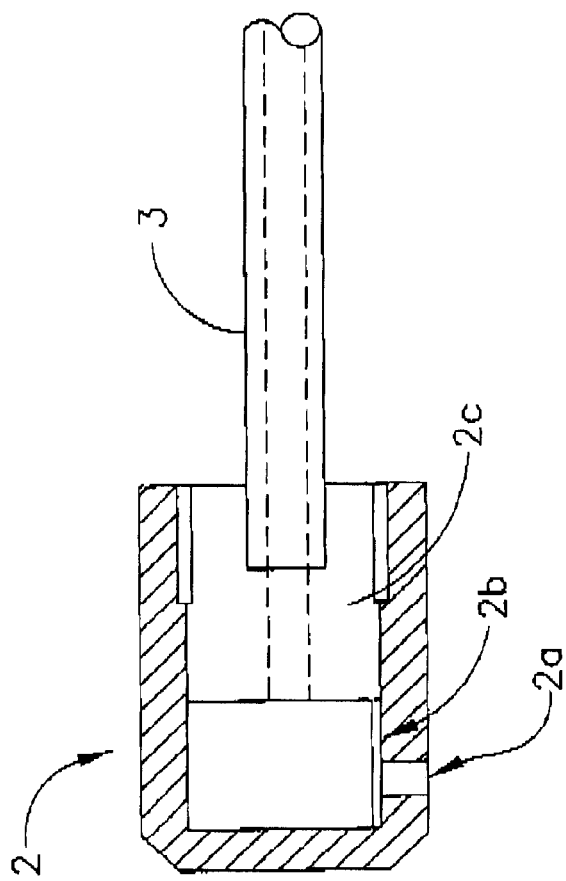
FIG. 3 is a cut away side view showing an embodiment of the ceramic torch head.

Referring to FIGS. 1, 2, 3 and 4, an embodiment of the invention is shown in which the Automatic Plasma Arc Tube Cutter/Welder is attached to an existing plasma arc power source 10. The pilot arc lead 11 and plasma are ground 12 are attached to a ground common with the tube 16 to be cut. The switching of the arc on and off is controlled through leads 7b that are connected to the switch terminals in 10 and led to a remote switch 7c. The power and gas lead 10a is led from its connection in 10 to swivel connection 5a. Motor power leads 7a are led from transformer 7e to rheostat 7d and motor 15. Leads all have insulated jackets and are kept together in flexible sheath 9. By combining control leads, and the power and gas lead in the same sheath, the invention is more conveniently adapted to an existing plasma arc power source once its factory torch and leads are disconnected. The inert gas 13 is connected as recommended by the manufacture of power source 10, with the invention's addition of the powdered metal hopper 14 and its valve 14a if needed for welding.

The actual cutting or welding occurs at the arc issuing from orifice 2a in the boron nitride ceramic 2. The ceramic is round and its outside diameter is such that it slides in and turns easily against the inside diameter of the tube. When switch 7c is pushed to "on" the power for the arc and the inert gas travel via 10a, which remains stationary, to swivel connection 5a, to wand 3, to bushing 2c, to tungsten 2b. A high voltage pilot arc created by 10 initiates the ionization of the inert gas at 2a. This is momentary and a transferred arc is established between the tungsten and tube wall. 7c also starts the motor turning and the arc is rotated over the inside diameter of the tube via ceramic 2 threaded onto bushing 2c which is threaded to wand 3 which is made fast to rotating housing 5 by compression fitting 4. Swivel 5a allows 10a, housing 8 and its attachments to remain stationary while gear set 6 affects rotation via motor 15. Motor speed is controlled by rheostat 7d and is adjusted according to thickness of the tube wall and plasma arc current which is set by controls on power source 10.

A boron nitride ceramic and a 2% thoriated tungsten are used with an inert gas to prevent contamination of the tungsten 2b an allow the ceramic 2 to withstand the elevated temperatures encountered by being in such close proximity to the cut or weld being made. The tungsten 2b is fired from its side, which allows for easier replacement of worn or damaged tungsten in that longer pieces are easier to work with and it merely lies in a machined groove in 2. When working in tubes with a small inside diameter, a tungsten fired from the end has to be so short as to preclude efficient repairs within the ceramic head 2 and would also complicate the electrical connections necessary between the tungsten 2b and wand 3. And flexible wand 3 is necessary for accessing entrance into those tubes where a rigid tool would not work. Wand 3 can also be manufactured in different lengths or used with an insulated stop collar to work at different depths inside the tube.

Although one detailed embodiment of the invention is illustrated in the drawings and previously described in detail, this invention contemplates any configuration and design of components, which will accomplish the equivalent result. As an example, the invention can be manufactured as an integral part of power source 10. Or the invention may be manufactured and marketed as a separate unit. Or the invention may be manufactured and marketed without items 14 and 14a, in which case it would be utilized as a tube "cutter" only.

I claim:

1. An automatic plasma arc tube cutter/welder which comprises (a) a flexible metal cable (wand) having an insulated outer jacket and an inner gas passage, manufactured in lengths according to the desired axis of rotation of the plasma arc; and (b) a stop collar secured to the cable (wand) for more accurate adjustment of the axis of rotation of the plasma arc; and (c) a threaded metal bushing attaching the cable (wand) to a round ceramic head, and providing an electrical connection to a tungsten electrode which arcs from its circumference through an orifice in the ceramic head, and providing a seal for the passage of gas and/or metal powder; and (d) a compression fitting securing the cable (wand) to a rotating housing; and (e) a swivel connection securing the rotating housing to a stationary power and gas lead; and (f) a rotating housing enclosing the swivel connection; and (g) a gear set connecting the rotating housing to a stationary housing; and (h) A stationary housing enclosing power and gas leads, switch leads, motor power leads, with an attached junction box enclosing an electric motor attached to the gear set in which the speed is controlled by a rheostat and a double pole momentary contact switch, which also starts the arc.

* * * * *